United States Patent [19]
Persson

[11] Patent Number: 5,406,155
[45] Date of Patent: Apr. 11, 1995

[54] METHOD AND APPARATUS FOR SENSING RELATIVE POSITION BETWEEN TWO RELATIVELY ROTATABLE MEMBERS

[75] Inventor: Erland Persson, Golden Valley, Minn.

[73] Assignee: TRW Inc., Lyndhurst, Ohio

[21] Appl. No.: 893,090

[22] Filed: Jun. 3, 1992

[51] Int. Cl.$^6$ ............... H02K 11/00; H02K 17/42; G01B 7/14
[52] U.S. Cl. ................... 310/68 B; 310/171; 324/207.17; 324/207.25
[58] Field of Search ............ 310/68 B, 168, 171, 310/268; 318/638, 647, 652, 653, 701; 341/15, 16; 324/207.17, 207.25; 340/870.31, 870.32, 870.25; 346/45

[56] References Cited

U.S. PATENT DOCUMENTS

| | | | |
|---|---|---|---|
| 2,650,352 | 8/1953 | Childs | 340/870.31 |
| 3,249,854 | 5/1966 | Nevius | 340/870.32 |
| 3,569,753 | 3/1971 | Babikyan | 310/268 |
| 3,812,481 | 5/1974 | Stednitz | 340/870.32 |
| 4,107,595 | 8/1978 | Campe | 318/696 |
| 4,207,487 | 6/1980 | Beyersdorf | 310/268 |
| 4,223,300 | 9/1980 | Wiklund | 340/196 |
| 4,268,769 | 5/1981 | Dorner et al. | 310/67 R |
| 4,429,307 | 1/1984 | Fortescue | 340/870.37 |
| 4,500,824 | 2/1985 | Miller | 318/701 |
| 4,621,231 | 11/1986 | Heinrich et al. | 324/142 |
| 4,645,961 | 2/1987 | Malsky | 310/254 |
| 4,670,696 | 6/1987 | Byrne et al. | 318/701 |
| 4,682,104 | 7/1987 | Lombard et al. | 324/208 |
| 4,695,780 | 9/1987 | Kurakake et al. | 318/561 |
| 4,837,492 | 6/1989 | Kurosawa et al. | 318/661 |
| 4,851,771 | 7/1989 | Ikeda et al. | 324/207.25 |
| 4,868,477 | 9/1989 | Anderson et al. | 318/696 |
| 4,961,038 | 10/1990 | MacMinn | 318/696 |
| 4,986,124 | 1/1991 | Byrne et al. | 324/208 |
| 5,012,172 | 4/1991 | Sember | 318/696 |
| 5,177,389 | 1/1993 | Schalk | 310/171 |

FOREIGN PATENT DOCUMENTS

| | | | |
|---|---|---|---|
| 1104601 | 4/1961 | Germany | 324/207.17 |
| 0581483 | 11/1977 | U.S.S.R. | 340/870.31 |
| 1019218 | 5/1983 | U.S.S.R. | 324/207.17 |

*Primary Examiner*—Steven L. Stephan
*Assistant Examiner*—C. LaBalle
*Attorney, Agent, or Firm*—Tarolli, Sundheim & Covell

[57] ABSTRACT

An apparatus for sensing the relative rotational position between first and second relatively rotatable members includes a transmitter disk having a planar surface and being mountable to the first member so that the planar surface of the transmitter disk is substantially perpendicular the an axis of rotation of the first and second members. The transmitter disk has a conductive material mounted to the planar surface in a circular pattern with a sinusoidal diameter. A receiving disk having a planar surface and is mountable to the second member so that the planar surface of the transmitter disk is substantially perpendicular the an axis of rotation of the first and second members. The receiving disk has a conductive material mounted thereon and arranged in a circular pattern with a squarewave diameter so as to receive a signal from the transmitter disk and output a signal indicative of the relative rotational position of the first and second members.

31 Claims, 6 Drawing Sheets

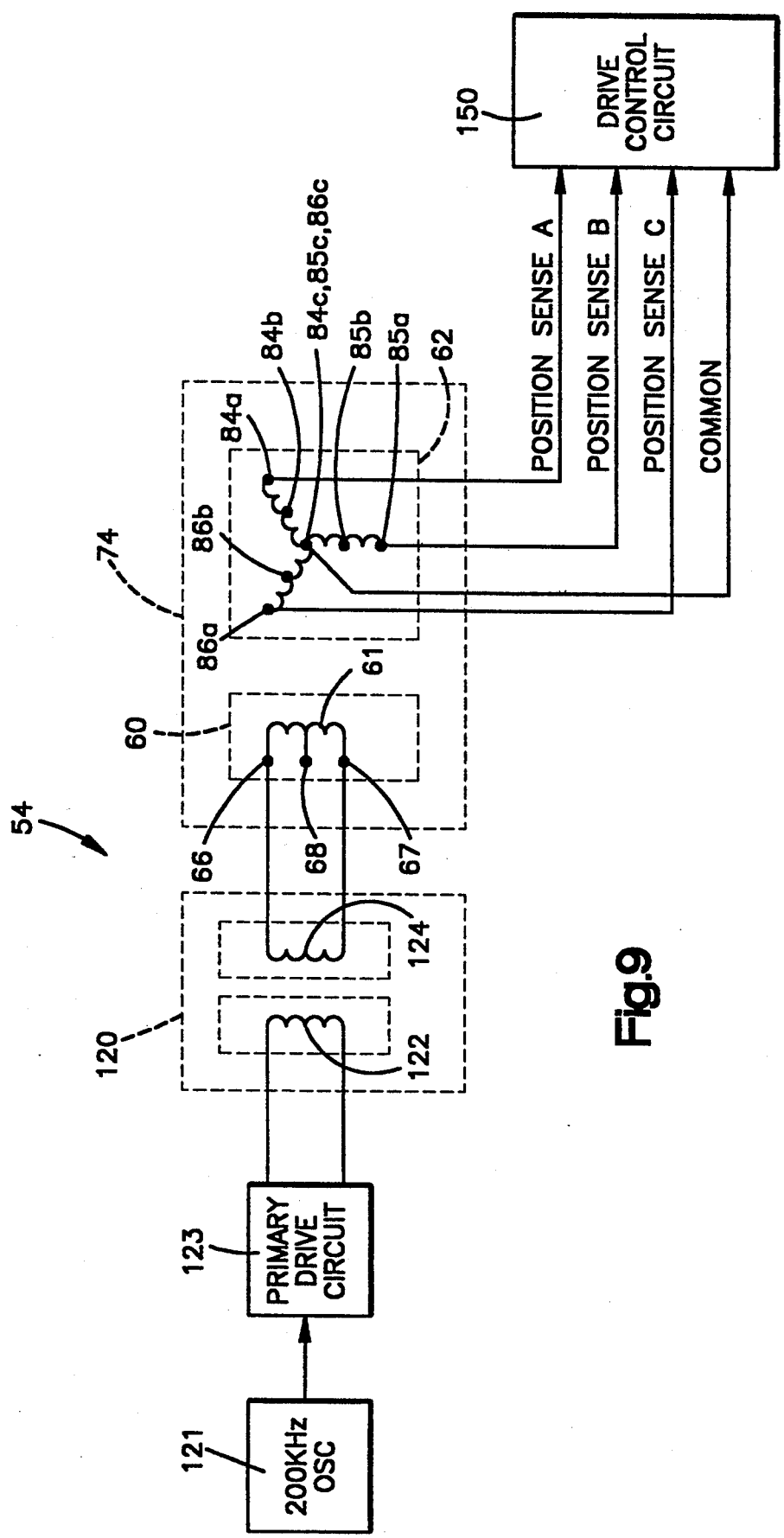

METHOD AND APPARATUS FOR SENSING RELATIVE POSITION BETWEEN TWO RELATIVELY ROTATABLE MEMBERS

TECHNICAL FIELD

The present invention is directed to a method and apparatus for sensing the relative rotational position between two relatively rotatable members. The invention has particular use for sensing the relative position of a rotor and stator in a variable reluctance motor for control of the motor's commutation in an electric assist steering system for vehicles.

BACKGROUND OF THE INVENTION

There are many known power assist steering systems for automotive vehicles. Some provide steering assist by using hydraulic power and others by using electric power.

Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. An electronic control system includes a torque sensor and a vehicle speed sensor. A computer receives the output signals provided by both sensors. The computer controls the amount of the assistance provided by the motor dependent upon the applied steering torque and the sensed vehicle speed.

U.S. Pat. No. 4,415,054 (now U.S. Reissue Pat. No. 32,222, hereinafter, "the Drutchas steering gear") utilizes an D.C. electric assist motor driven through an H-bridge arrangement. The motor includes a rotatable armature encircling a steering member which has a thread convolution portion thereon and a portion having straight cut rack teeth thereon. Rotation of the electric assist motor armature causes linear movement of the steering member through a ball-nut drive arrangement in combination with the thread convolution portion of the steering member. A torque sensing device is coupled to the steering column to sense driver applied input torque to the steering wheel. The torque sensing device uses a magnetic Hall-effect sensor arrangement for sensing relative rotation between the input and output shafts across a torsion bar. An electronic control unit monitors the signal from the torque sensing device and controls the electric assist motor in response thereto.

U.S. Pat. No. 4,660,671 discloses an electric controlled steering system that is based on the Drutchas steering gear. In the arrangement disclosed in the '671 patent, the D.C. motor is axially spaced from the ball-nut and is operatively connected thereto through a connection tube. The electronic controls includes a plurality of diagnostic features that monitor the operation of the steering system. If an error in the operation of the electric steering system is detected, the power assist system is disabled and steering reverts to an unassisted mode.

Known electric steering systems have used a D.C. permanent magnet motor driven through a H-bridge drive circuit. It is desirable to use a variable reluctance motor for an electric assist steering system because of its smaller size and larger torque-to-inertia ratio. Proper commutation of a variable reluctance motor requires a "knowledge" of the rotor's position relative to the stator.

SUMMARY OF THE INVENTION

The present invention provides a method and apparatus for sensing the relative rotational position between two relatively rotatable members.

In accordance with one embodiment of the present invention, an apparatus is provided for sensing the relative rotational position between first and second relatively rotatable members. The apparatus comprises a transmitter disk having a planar surface and being mountable to said first member so that said planar surface of said transmitter disk is substantially perpendicular the an axis of rotation of the first and second members. The transmitter disk has a conductive material mounted to said planar surface and patterned in the form of a circle whose diameter is modified by a multipole sinusoid. A receiving disk has a planar surface and is mountable to said second member so that said planar surface of said receiving disk is substantially perpendicular the axis of rotation of the first and second members. The receiving disk has a conductive material mounted thereon and arranged in a circular pattern whose diameter is modified by a square wave so as to receive a signal from the transmitter disk and output a signal indicative of the relative rotational position of the first and second members.

In accordance with another embodiment of the present invention, a method is provided for sensing the relative rotational position between first and second relatively rotatable members, comprising the steps of: (a) providing a transmitter disk having a planar surface; (b) securing a conductive material to the planar surface of the transmitter disk in a circular pattern with a diameter modified by a sinusoid; (c) mounting said transmitter disk to said first member so that said planar surface of said transmitter disk is substantially perpendicular to an axis of rotation of the first and second members; (d) providing a receiving disk having a planar surface; (e) securing a conductive material to the planar surface of the receiving disk in a circular pattern with a diameter modified by a squarewave so as to receive a signal from the transmitter disk and output of a signal indicative of the relative rotational position of the first and second members; and (f) mounting said receiving disk to said second member so that said planar surface of said receiving disk is substantially perpendicular to the an axis of rotation of the first and second members.

In accordance with a preferred embodiment of the present invention an apparatus is provided for sensing position of a rotor relative to a stator in a variable reluctance motor, said apparatus comprising a first disk having a planar surface, said first disk mounted to said rotor so that said planar surface of said first disk is substantially perpendicular to the axis of rotation of the rotor. A second disk is provided having a planar surface, said second disk being mounted so as to be stationary relative to the stator and adjacent said first disk with said planar surface of said first and second disks being substantially parallel. A transmitter coil is carried by one of said first and second disks. A receiving coil is carried by the other of said first and second disks. Means are provided for generating a drive signal and coupling said drive signal to said transmitter coil. Means are also provided monitoring the output of said receiving coil and for determining the relative rotation between the rotor and the stator in response to the monitored signal. The transmitter coil is preferably a circular shape having a diameter in the form of two sinusoids 180 degrees out of phase, each sinusoid being mounted to an associated side of its disk and electrically insulated from the other sinusoidal pattern. The receiving coil preferably includes three dual coil circular patterns mounted to associated disk layers. Each disk has a square wave pattern on each side, the patterns on one disk being 180 mechanical degrees out of phase with each other. The square wave shape on the same side of each disk layer is rotationally offset from the pattern on an adjacent disk by 120 electrical degrees. The patterns on adjacent faces of different disk layers are electrically insulated from one another. The means for generating a drive signal and coupling said drive signal to said transmitter coil includes a rotary transformer having its primary coil mounted to a member which is stationary relative to said stator and its secondary mounted to said rotor, said secondary of said rotary transformer being electrically connected to the transmitter coil, said transmitter coil being carried by the disk mounted to said rotor. Each of the disks and the coils of the rotary transformer have backing members made from material having a magnetic permeability of preferably greater than 40.

BRIEF DESCRIPTION OF THE DRAWINGS

Further features of the present invention will become apparent to those skilled in the art to which the present invention relates from reading the following specification with reference to the accompanying drawings, in which:

FIG. 9 is a schematic circuit diagram of the drive arrangement for the rotor position sensor made in accordance with the present invention;

DESCRIPTION OF PREFERRED EMBODIMENT

Figure 1:
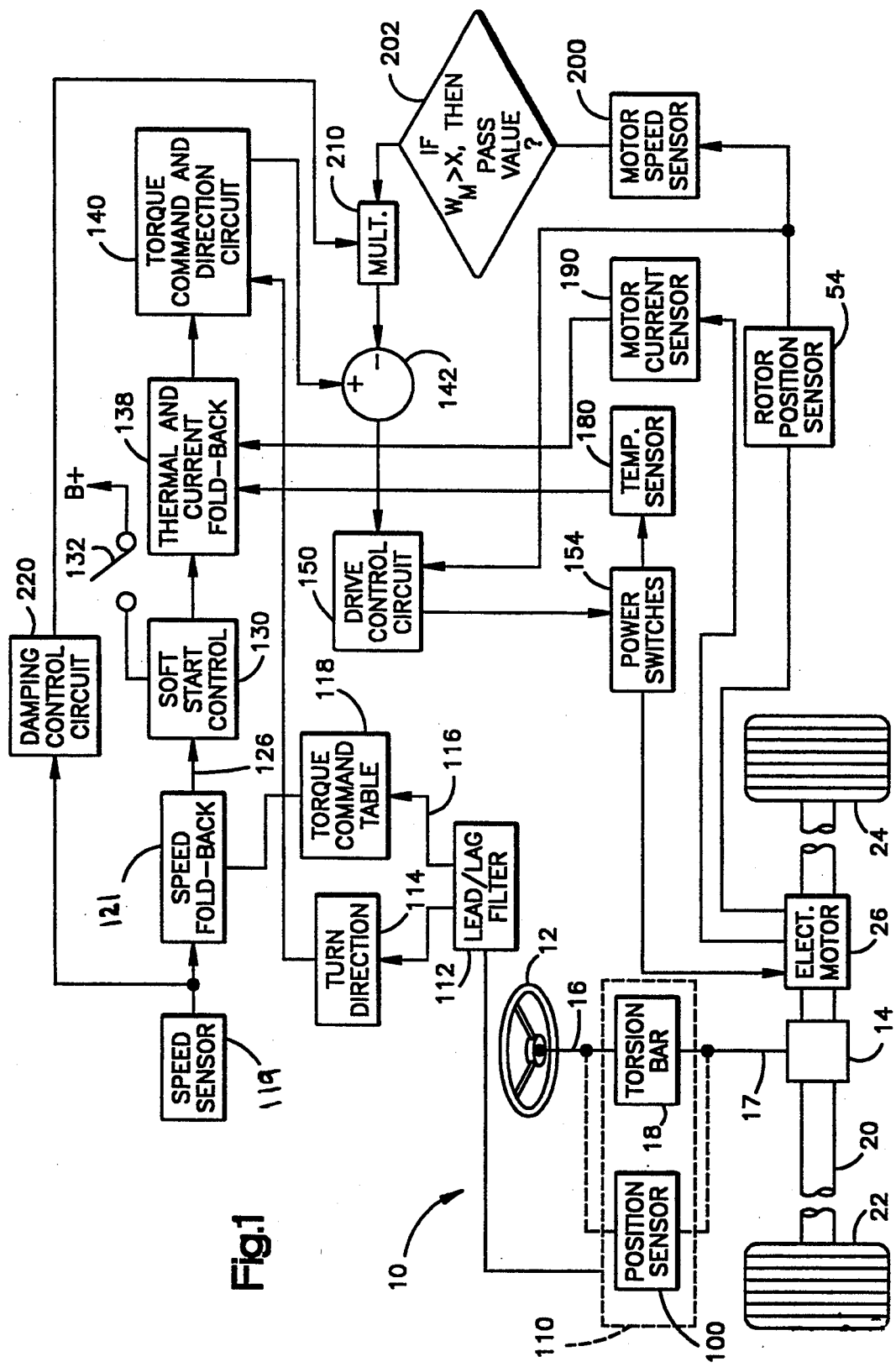
FIG. 1 is a schematic block diagram illustrating a power assist steering system having a rotor position sensor made in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 17. The input shaft 16 is operatively coupled to the output shaft 17 through a torsion bar 18. The torsion bar 18 twists in response to applied steering torque thereby permitting relative rotation between the input shaft 16 and the output shaft 17. Stops, not shown, limit the amount of such relative rotation between the input and output shafts in a manner well known in the art.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axes and the vehicle is steered.

An electric assist, variable reluctance motor 26 is drivingly connected to the rack 20. When the electric motor 26 is energized, it provides power assist steering so as to aid in the rotation of the vehicle steering wheel by the vehicle operator and, in turn, turning of the steerable wheels. A variable reluctance motor is desirable for use in an electric assist steering system because of its small size, low friction, and its high torque-to-inertia ratio.

Figure 2:
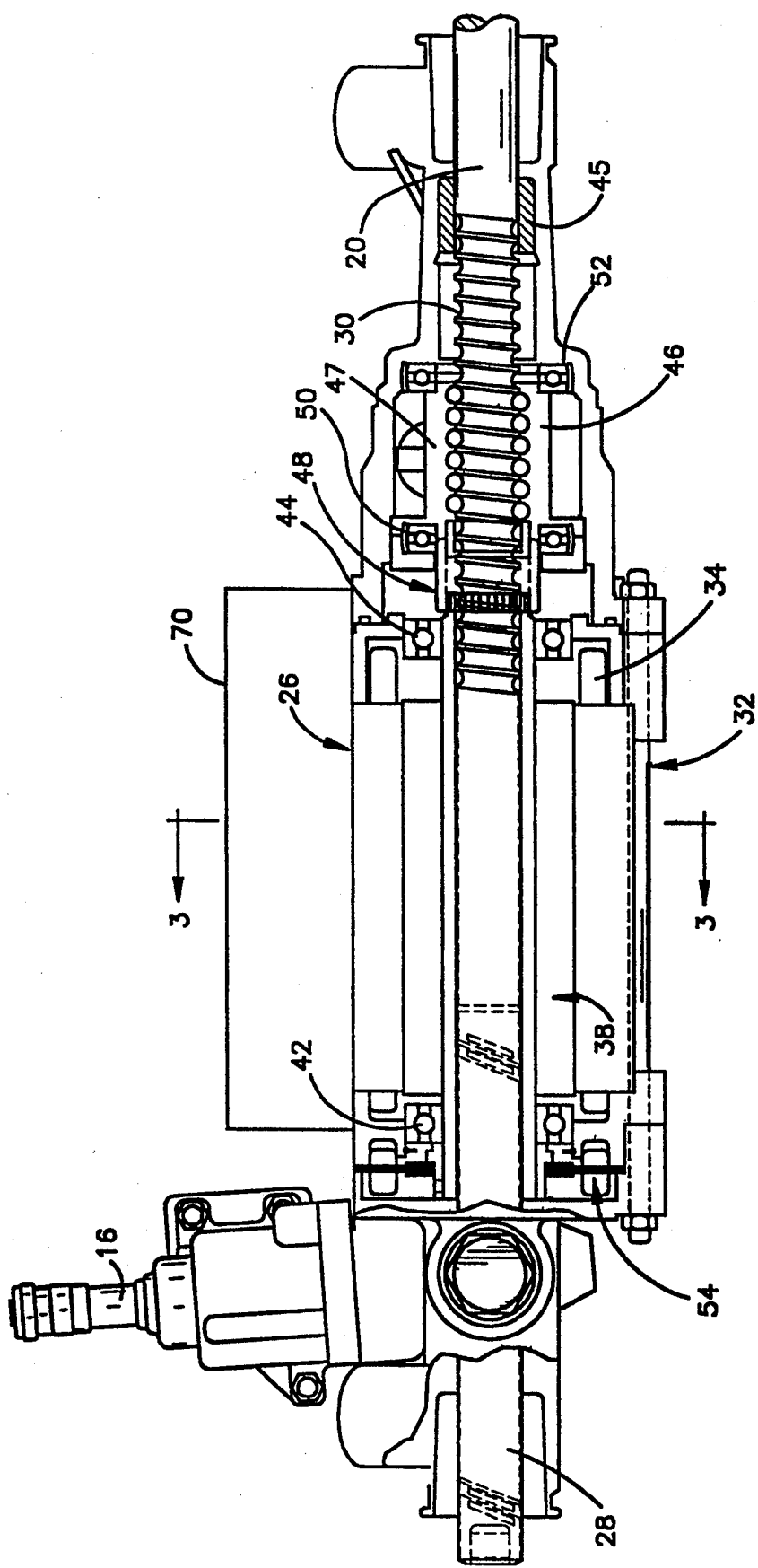
FIG. 2 is a plan view partially in section of a portion of the power assist steering system of FIG. 1.
Figure 3:
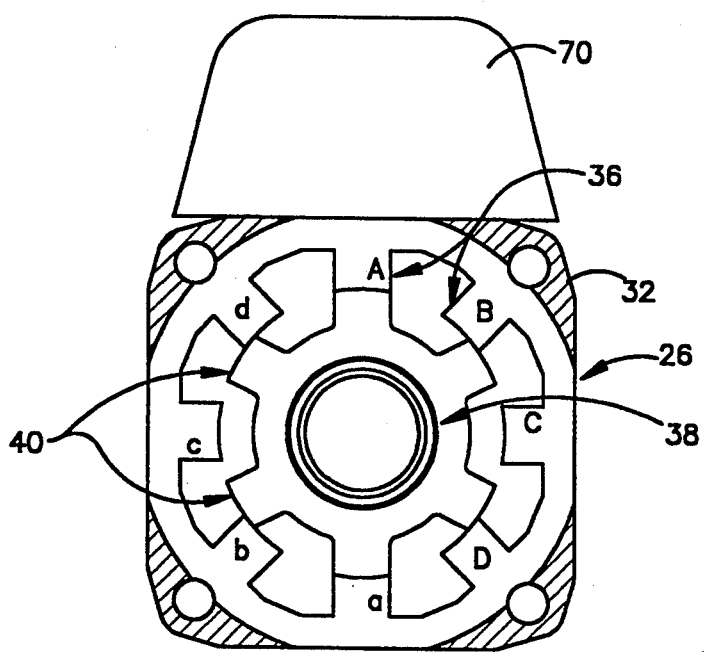
FIG. 3 is a cross section view as seen from the line 3—3 of FIG. 2.
Figure 4:
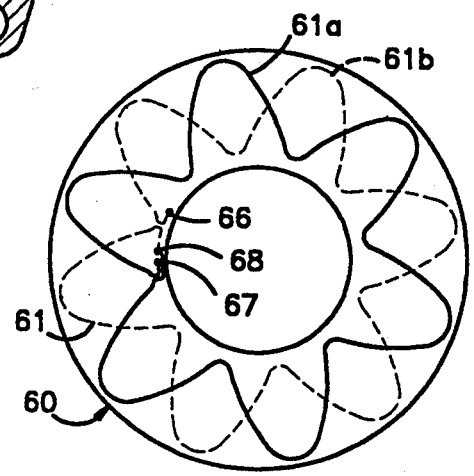
FIG. 4 is a plan view of the transmitter disk of the rotor position sensor shown in FIG. 1.

Referring to FIGS. 2 and 3, the rack 20 has a straight rack tooth portion 28 in meshing engagement with the pinion gear. The rack 20 also has a threaded convolution portion 30. The variable reluctance motor 26 circumscribes the rack 20 and is mounted in a motor housing 32. The motor 26 includes a plurality of stator windings 34, each one wrapped about its associated stator pole 36. The motor 26 also includes a rotor 38 having a plurality of rotor poles 40. In a preferred embodiment of the present invention, the variable reluctance motor includes eight stator poles and six rotor poles. The stator poles are arranged so as to be energized in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized. The direction of motor rotation is controlled by the sequence in which the stator coils are energized. The torque produced by the motor is controlled by the current through the stator coils. A preferred manner for controlling a variable reluctance motor so as to control motor torque and direction without torque ripple are fully disclosed in U.S. Pat. No. 4,868,477, which is hereby fully incorporated herein by reference.

The motor 26 is mounted in the motor housing 32 and rotatably supports the rack 20 through bearings 42, 44. The rack is also supported by the pinion gear and bearing 45. The motor rotor is drivingly connected to a ball-nut drive arrangement 46 through a connection tube 48. The ball-nut drive arrangement 46 circumscribes the threaded convolution portion 30 of the rack 20 with the nut portion being operatively connected to the threaded convolution portion of the rack through a plurality of balls 47. Such an arrangement is fully described in the above-mentioned Drutchas U.S. Pat. No. 4,415,054, now U.S. Reissue Pat. No. 32,222, which is hereby fully incorporated herein by reference. Basically, when the motor is energized, the rotor turns which, in turn, rotates the nut portion of the ball-nut drive arrangement. When the nut rotates, the balls transfer a linear force to the rack. The direction of rack movement is dependent upon the direction of rotation of the motor. The nut is rotatably supported in the housing 32 by thrust bearings 50, 52.

A rotor position sensor 54, made in accordance with the present invention, is operatively connected to the motor rotor and to the motor housing. The stator and motor housing are relatively stationary. The function of the rotor position sensor is to provide an electrical signal indicative of the position of the rotor relative to the motor stator. For proper operation of the variable reluctance motor, including direction of rotation and applied torque, it is necessary to know the position of the rotor relative to the stator.

Referring to FIGS. 4–9, a rotor position sensor made in accordance with the present invention is shown. The sensor is a two part device including a transmitter disk 60 having a primary winding 61 and a multi-layer receiver disk 62. The disks are preferably made from a circuit board material with conductive electrical tracks mounted thereon. The method for mounting the tracks is known in the art. The disks 60, 62 form a rotary transformer 74.

A second rotary transformer 120 is operatively coupled between the housing 32 and the rotor 38. The second rotary transformer 120 includes a primary coil 122 mounted to the housing 32 and electrically connected to a signal generator 121 through a primary drive circuit 123. The rotary transformer 120 further includes a secondary coil 124 mounted to the rotor 38 and electrically connected to the transmitter primary coil 61 of the transmitter disk 60. The purpose of the second rotary transformer 120 is to couple the sinusoidal drive signal from the drive circuit 123 to the primary drive coil 61 of the rotary position sensor 54. For the electric coupling to occur between the coils 122, 124, the two coils must be axially aligned an spaced within a sufficiently close radial proximity to insure EMF coupling.

The transmitter disk 60 is made from a circuit board material and is mounted to the rotor 38 so that its two planar surfaces are substantially perpendicular to the axis of the rotor. The primary winding 61 on the transmitter disk is arranged in the form of a circle pattern conforming to the following equation:

$$C = R \times \mathrm{Sin}\,(6\alpha)$$

where C equals the radial distance of the pattern from the center of rotation of the disk, R equals the average radius of the pattern, and $\alpha$ equals the mechanical angle in degrees. The number six is the number of poles (twelve) divided by two. The pattern on one side of the disk is designated 61a. A pattern, designated 61b, is formed on the other side of the transmitter disk 60 and is in the form of this same equation and positioned 180 electrical degrees out of phase with the pattern 61a.

The two patterns 61b, 61a each have a first connection point 66, 67, respectively, and a common connection point 68 connected to the other patterns common connection point. The secondary of the rotary transformer 120 is connected to the connection points 66, 67 of the two patterns 61b, 61a, respectively.

The receiving disk 62 is mounted to the housing 32 and axially spaced from the transmitting disk 60 but in operative EMF coupling communication therewith. The receiving disk 62 has its planar surfaces substantially parallel to the planar surfaces of the transmitter disk 60.

Figure 5A:
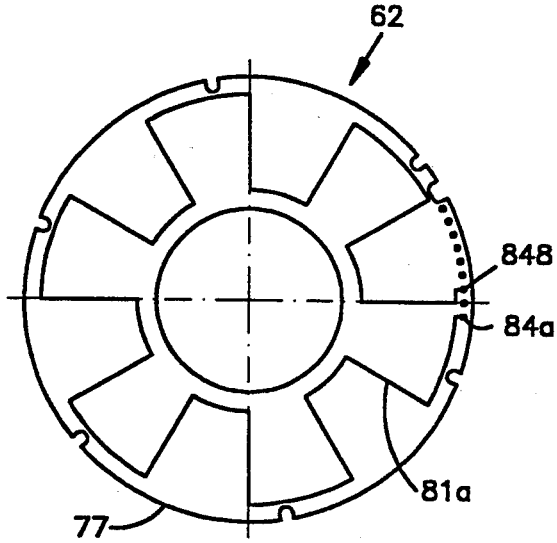
FIG. 5A is a plan view of one layer of the receiver disk of the rotor position sensor shown in FIG. 1 showing the receiver pattern on the top face of that layer.
Figure 5B:
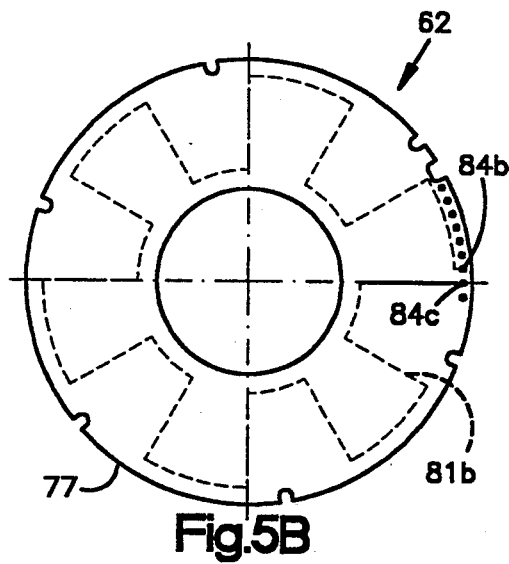
FIG. 5B is a plan view as viewed from the top face of the one layer of the receiver disk of the rotor position sensor shown in FIG. 1 showing the receiver pattern on the bottom face of that layer.
Figure 6A:
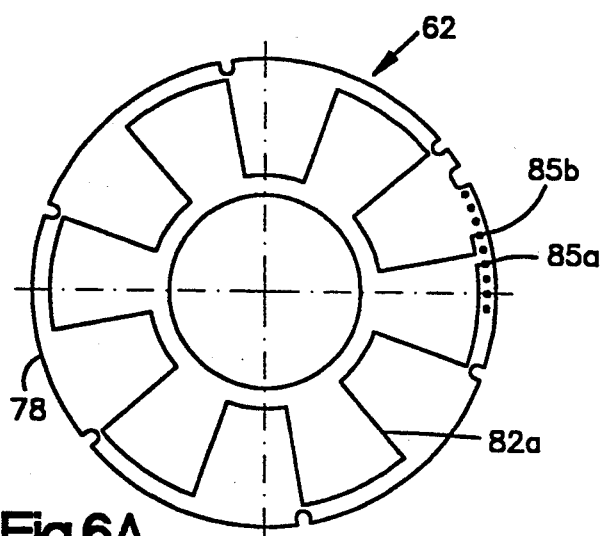
FIG. 6A is a plan view of a second layer of the receiver disk of the rotor position sensor shown in FIG. 1 showing the receiver pattern on the top face of that layer.
Figure 6B:
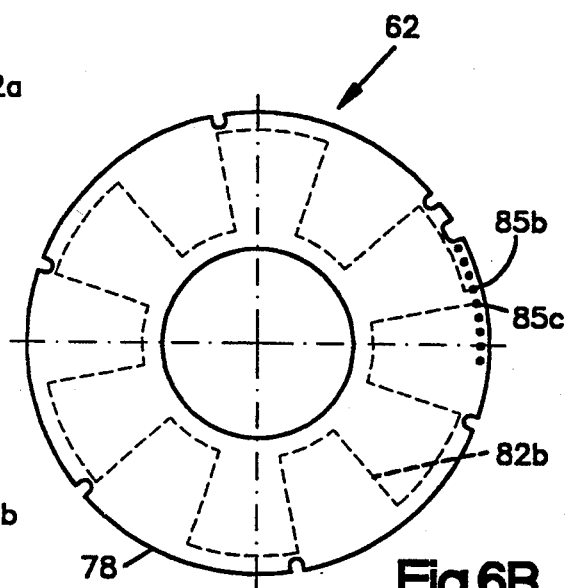
FIG. 6B is a plan view as viewed from the top face of the second layer of the receiver disk of the rotor position sensor shown in FIG. 1 showing the receiver pattern on the bottom face of that layer.
Figure 7A:
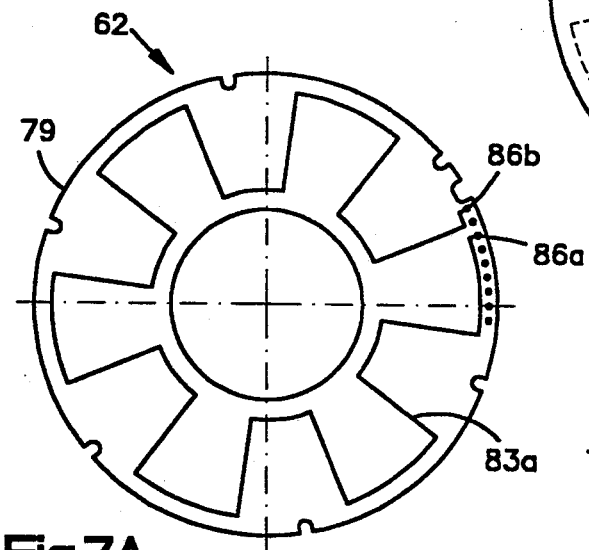
FIG. 7A is a plan view of a third layer of the receiver disk of the rotor position sensor shown in FIG. 1 showing the receiver pattern on the top face of that layer.
Figure 7B:
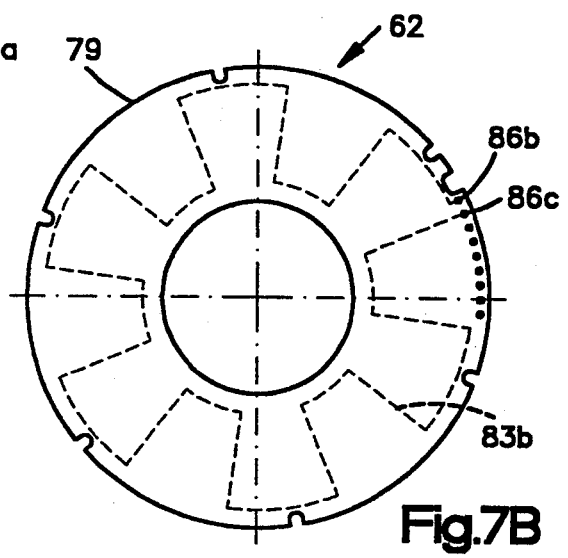
FIG. 7B is a plan view as viewed from the top face of the third layer of the receiver disk of the rotor position sensor shown in FIG. 1 showing the receiver pattern on the bottom face of that layer.
Figure 8:
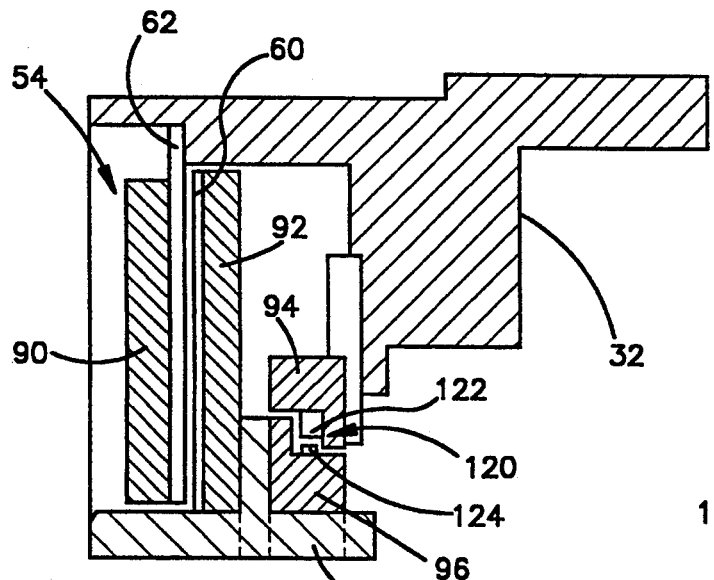
FIG. 8 is a side sectional view of a portion of the rotor position sensor shown in FIG. 1.

The receiving disk 62 is a multi-layer disk made from a printed circuit board material. The receiving disk comprises three disk layers 77, 78, 79. When assembled, the disks are secured together with an insulating layer therebetween. The first disk 77 is shown in FIGS. 5A and 5B. The second disk 78 is shown in FIGS. 6A and 6B. The third disk 79 is shown in FIGS. 7A and 7B. FIGS. 5B, 6B, and 7B are viewed from the same side of the disk as the view shown in FIGS. 5A, 6A, and 7A, respectively. This is done so that it is easier to see that the patterns on each of the two sides of a disk are 180 electrical degrees out of phase relative to each other. An X-Y coordinate line is shown for each of the disks so that it is easier to see that the patterns of adjacent disks are 120 electrical degrees shifted.

As mentioned, each disk layer has a pattern on each side of the disk layer oriented 180 electrical degrees out of phase relative to each other. Each pattern on a disk side includes a plurality of radial lines, each radial line forming a pole. In accordance with a preferred embodiment of the present invention, each disk layer has twelve poles or twelve radial lines. Each radial line length is preferably equal to the outer and inner limits of the transmitter pattern shown in FIG. 4. The radial lines on one side of a receiving disk layer are alternately connected at the inner and outer limits. Each pattern is in the form of a circle with a diameter modified in the form of a square wave. The patters that make up the receiving disk are designated 81a, 81b, 82a, 82b, 83a, and 83b. One outer diametral line of each pattern has electric connection terminals. Disk 77 has connection terminals 84a, 84b on one side and 84b and 84c on the other side. Disk 78 has connection terminals 85a, 85b on one side and 85b and 85c on the other side. Disk 79 has connection terminals 86a, 86b on one side and 86b and 86c on the other side. The "b" connection terminals are common for both sides of a disk layer.

The patterns on each of the three layers of the receiving disk has one common connection terminal 84c, 85c, 86c, connected to the common connection terminal of the other two coil patterns on the other layers. The common connection terminals 84c, 85c, and 86c of the receiving disk 62 and the three other connection terminals 84a, 85a, and 86a are all connected to the drive control circuit 150.

The primary coil 60 of the rotary position sensor 54 is driven with a sinusoidal signal having a frequency of 200 kHz. Each of the three receiving coil sets or secondary windings will output a sinusoidal wave, each being electro-mechanically offset from each other by 120 degrees. The output signal from the receiving coils can be expressed as:

$$V1 = v \sin(\omega t) \sin(\alpha + 0)$$

$$V2 = v \sin(\omega t) \sin(\alpha + 120)$$

$$V3 = v \sin(\omega t) \sin(\alpha + 240)$$

where $\omega t$ is the drive circuit frequency, $\alpha$ is the shaft angle in electro-mechanical degrees, and the equations represent the value of the voltage present across its associated coil. This yields three equations with three unknowns. As the transmitting disk 60 rotates relative to the receiving disk 62, as occurs when the rotor moves relative to the stator, the values output from the three coils varies. At any instant in time (including a time when the disks are relatively stationary), the value of the voltage present at the outputs of the receiving coils can be measured and the equations can be solve for $\alpha$. The solution of the equations for $\alpha$ represents the rotary position of the motor rotor relative to the stator or to the motor housing. Knowing the position of the rotor relative to the stator permits control of the commutation of the motor.

The position sensor, as mentioned, has twelve poles. The poles are arranged so that the output of the receiving patterns will go through six cycles for each 360 degrees of relative rotation between the transmitting disk and the receiving disk or between the rotor and the stator. If one output of a receiving pattern were to be observed, the output voltage would follow a sine wave pattern and end at its starting point each 1/6th of a relative rotation between the stator and the rotor. Therefore, the voltage at the output of a receiving pattern goes through a 360 electrical degrees for each 60 degrees of mechanical rotation between the rotor and the stator.

Disk 62 has an associated backing material 90 mounted thereto on the side opposite the transmitting disk 60. Disk 60 has an associated backing material 92 mounted thereto on the side opposite the receiving disk 62. Coil 122 has a backing material 94 mounted thereto and coil 124 has a backing material 96 mounted thereto. The backing materials 90, 92, 94, and 96 are made from a material that will provide a return path for their associated magnetic circuit. The back material is made from material that will also provide filtering for electro-magnetic interference from outside sources and even from the operation of the electric assist motor itself. The magnetic permeability of air is one. The backing materials are made from material having a magnetic permeability greater than one and preferably equal to 40 at a drive frequency of 200 kHz. Preferably, the backing material is made from powered iron, soft sintered ferrite, or sendust/iron particle filed plastic.

Referring back to FIG. 1, a position sensor 100 is operatively connected across the input shaft 16 and the output shaft 17 and provides an electrical signal having a value indicative of the relative rotational position between the input shaft and the output shaft. The position sensor 100 in combination with the torsion bar 18 form a torque sensor 110. The output of the position sensor is indicative of the applied steering torque to the vehicle steering wheel 12 by the vehicle operator.

The output of the torque sensor 110 is connected to a lead/lag filter 112. The lead/lag filter 112 processes the torque signal and separates it into a direction signal 114 and a magnitude signal 116. In processing the torque signal, the lead/lag filter 112 amplifies the value of torque signal.

The torque magnitude value 116 is converted to a torque command signal preferably by use of a torque look-up table 118 based upon the torque magnitude. Those skilled in the art will realize that filtering of the output of the torsion sensor signal may be distributed differently about the torque command table than is specifically shown and described. For example, the output of the position sensor may be directly connected to the table 118 and the filtering occurring at the output of the table.

A speed sensor 119 is operative connected to the vehicle and outputs a signal having a value indicative of the vehicle's speed. The output of the speed sensor 119 and the output from the torque command table 118 are combined in a speed fold-back circuit 121. As is well known in the art, the amount of power assist desired for a vehicle steering system decreases as vehicle speed increases. Therefore, to maintain a proper or desirable feel to steering maneuvers, it is desirable to decrease the amount of steering power assist as the vehicle speed increases. The output 126 of the speed fold-back circuit is a torque command signal that is "corrected" as a function of vehicle speed.

The output 126 is connected to a soft start control circuit 130. The soft start control circuit 130 is also operatively connected to the vehicle ignition switch 132 for detection of when the vehicle is first started. The purpose of the soft start control circuit is to prevent full assist from being provided to the vehicle the instant the vehicle is being started. It is not uncommon for the vehicle operator to be applying torque to the steering wheel with one hand while he is turning the ignition switch to the starting position. If full power assist were immediately available, the steering wheel would jerk in his hand. The soft start circuit prevents this unpleasant event from happening and simulates the operation of a hydraulic power assist steering system which does not provide full power assist until the vehicle motor is running at speed (as opposed to cranking speed).

The output of the soft start circuit, after an initial time delay for starting of the vehicle, is the torque demand or request signal "corrected" for vehicle speed. The output of the soft start circuit is connected to a thermal and current fold-back circuit 138 that further modifies the torque request signal as a function of the current through the motor and the temperature of the power switch used to drive the motor. The output of the fold-back circuit 138 is connected to the torque command and direction circuit 140. The direction signal 14 is also connected to the torque command and direction circuit 140. The circuit 140 recombines the torque direction signal with the torque request signal that has been "corrected" for (i) vehicle speed, (ii) soft start, (iii) sensed motor current, and (iv) sensed temperature of the power switches. The output of the torque command and direction circuit 140 is connected as one input of a summing circuit 142.

The output of the summing circuit 142 is connected to the input of a drive control circuit 150. As mentioned the output of the rotor position sensor 54 is also connected to the drive control circuit 150. Based upon the torque command signal and direction output from the summing circuit 142 and based upon the position of the rotor relative to the stator as determined from the output of the receiver disk 62, the drive control circuit 150 controls energization of the electric assist motor 26 in terms of sequence and current applied to the stator coils through a plurality of power switches 154.

The drive control circuit 150 is preferably is a microcomputer. Commutation or drive pulses may need to be output to the stator windings at a rate faster than the motor position data can be processed from the sensor 54 to insure smooth operation of the variable reluctance motor. To solve this problem, it is preferable that the position of the rotor be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, Nov. 6-8, 1985, both papers being hereby fully incorporated herein by reference.

Figure 10:
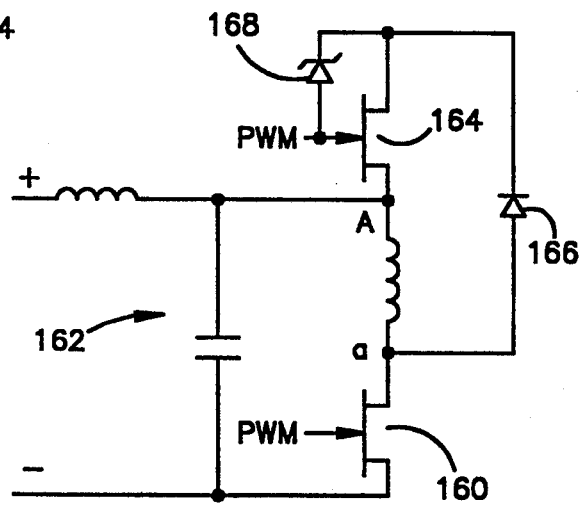
FIG. 10 is a circuit schematic of the power switch shown in FIG. 1.

Referring to FIG. 10, a typical drive circuit is shown for a pair of the stator coils Aa. The main drive switch 160 is operatively connected between one side of the stator coil and electrical ground. The other side of the coil pair Aa is connected to the vehicle battery through a filter network 162. Current control is accomplished by the drive control circuit pulse-width-modulating ("PWM") the switch 160. The drive control circuit 150 further controls switching of a switch 164 which is connected in parallel with the stator coil pair through a series connected diode 166. The switch 164 provides a return of energy when the coil pair Aa is de-energized. Zener diode 168 provides a current return path.

A temperature sensor 180 is operatively connected to the power switches 160 of each coil pair and is preferably connected to a common heat sink to which the power switches 160 are mounted. The output of the temperature sensor is connected to the thermal and current fold-back circuit 138. If the temperature of the power switches 160 is too high, i.e., greater than a predetermined value, the torque demand signal is decreased to prevent the power switches from burning out.

A motor current sensor 190 is operatively connected to the electric motor 26 for sensing the amount of current therethrough. The output of the current sensor 190 is connected to the thermal and current fold-back circuit 138. If the sensed current through the motor is too high, i.e., greater than a predetermined value, the torque demand signal is decreased to prevent the power switches from burning out.

The output from the rotor position sensor 54 is also connected to a motor speed sensor circuit 200. In accordance with one embodiment of the present invention, the change in the rotor position as a function of time is indicative of the rotor and, in turn, the motor speed. The output of the motor speed sensing circuit is an electric signal having a value indicative of the motor speed.

The output of the speed sensor 200 is connected to a decision circuit 202 that determines if the motor speed $W_M$ is greater than a predetermined value "x". If it is, then the value of the motor speed from the sensor 200 is passed to a multiplier circuit 210.

Figure 11:
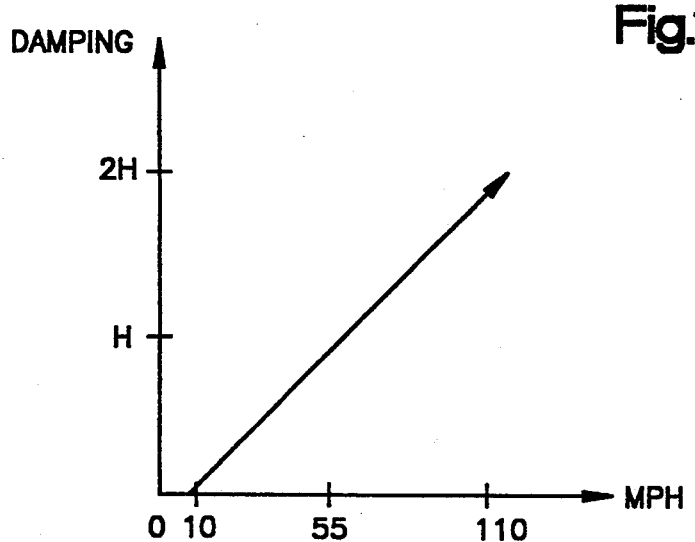
FIG. 11 is a graphical representation of a desired damping characteristic in an electric assist steering system having a rotor position sensor made in accordance with the present invention.

The vehicle speed sensor 119 is connected to a damping control circuit 220 that outputs a damping control signal having a value functionally related to the value of the sensed vehicle speed. Referring to FIG. 11, a linear function between a damping value and sensed vehicle speed is depicted. For a vehicle speed less than 10 mph, the damping value output from the circuit 220 is zero. At 55 mph, the damping value is that equal to the damping value found in a hydraulic power assist steering system at that speed. At 110 mph, the damping value output from the circuit 220 is preferably equal to twice that found in a hydraulic power assist steering system at 55 mph. The output of the damping control circuit 220 is connected as a second input of the multiplier circuit 210. The output of the multiplier circuit 210 is the second input of the summing circuit 142.

When a vehicle is in a steering maneuver, i.e., the steering wheel and the steerable wheels are turned while the vehicle is traveling, road forces and caster of the steerable wheels tend to return the steerable wheels to a straight-ahead position. Damping is the amount of retarding force to the return of the steerable wheels to the straight-ahead position. If the damping is equal to zero, there is no resistance to the wheels returning to the straight-ahead position. If the vehicle is traveling at a high rate of speed and the damping is zero, the vehicle may become unstable resulting in increasing yaw rate of the vehicle and "spinning-out."

The damping of the vehicle yaw is functionally related to both the sensed vehicle speed and the sensed speed of the power assist motor. The damping of the steering assist when the vehicle is traveling at less than 10 mph is zero since the return force acting on the vehicle steerable at less than 10 mph is very small. As the vehicle speed increases, the damping force value output from the circuit 220 increases. The output from the circuit 200 is providing a value indicative of how fast the steerable wheels are returning to the straight-ahead position. The faster the steerable wheels are returning toward center, the greater the damping force that will be in effect. Based on vehicle steering system geometry, other damping coefficient calibration may be desirable for good "feel." The damping value from the output of the multiplier 210 is the negative input to the summing circuit 142.

It should further be appreciated that it is desirable to include self-diagnostic features in an electric assist steering system to issue proper operation. Such a diagnostic arrangement for electric assist steering systems is fully described in U.S. Pat. No. 4,660,671 which is hereby fully incorporated herein by reference.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. An apparatus for sensing the relative rotational position between first and second relatively rotatable members, comprising:

a transmitter disk having a planar surface and being mountable to said first member so that said planar surface of said transmitter disk is substantially perpendicular the an axis of rotation of the first and second members, said transmitter disk having a conductive material mounted to said planar surface and patterned in the form of a circle having a sinusoidally modified diameter; and a receiving disk having a planar surface and being mountable to said second member so that said planar surface of said receiving disk is substantially perpendicular the an axis of rotation of the first and second members, said receiving disk having a conductive material mounted thereon and arranged in a pattern so as to receive a signal from said transmitter disk and output a signal indicative of the relative rotational position of the first and second members.

2. The apparatus of claim 1 wherein said pattern of conductive material mounted on said receiving disk is in the form of a circle having a square wave modified diameter.

3. The apparatus of claim 1 wherein said receiving disk includes three separate layers, each layer having a conductive material pattern on each side of the layer, the layers being electrically insulated from each other by an insulating material.

4. The apparatus of claim 3 wherein the patterns on each layer of said receiving disk has its conductive material pattern electrically offset from those on an adjacent layer by 120 electrical degrees.

5. The apparatus of claim 3 wherein the patterns of conductive material on opposite sides of a layer are offset from each other by 180 electrical degrees.

6. The apparatus of claim 1 further including a rotary coupling transformer operatively mounted between a stationary member and the first rotary member, a primary coil of said rotary coupling transformer being electrically connectable to a sinusoidal drive signal, a secondary coil of said rotary coupling transformer being electrically connected to the conductive layer of said transmitting disk for providing a drive signal to said transmitting disk.

7. The apparatus of claim 1 wherein said transmitter disk and said receiving disk each include an associated backing member mounted thereto and made from a material having a magnetic permeability greater than one.

8. The apparatus of claim 7 wherein said backing members are made from a material having a magnetic permeability equal to 40.

9. An apparatus for sensing the relatively rational position between a stator and a rotor of a variable reluctance motor, said apparatus comprising:

a transmitter disk having a planar surface and being mountable to said rotor so that said planar surface of said transmitter disk is substantially perpendicular the an axis of rotation of said rotor, said transmitter disk having a conductive material mounted to said planar surface and patterned in the form of a circle having a sinusoidal modified diameter; and a receiving disk having a planar surface and being mountable to said stator so that said planar surface of said receiving disk is substantially perpendicular the an axis of rotation of the rotor, said receiving disk having a conductive material mounted thereon and arranged in a pattern so as to receive a signal from said transmitter disk and output a signal indicative of the relative rotational position of said rotor relative to said stator;

means for coupling a transmitting signal to said conductive layer of said transmitter disk; and means for receiving an output signal from said conductive material of said receiving disk.

10. The apparatus of claim 9 wherein said receiving disk includes three disk layers, each disk layer having a conductive material patterns on side, each disk layer being electrically insulated from an adjacent layer by an insulated layer and electrically offset from a conductive pattern on an adjacent disk layer by 120 degrees, said receiving means monitoring the output of the three patterns and determining relative position in response to the three output signals.

11. The apparatus of claim 9 wherein said means for coupling includes a rotary coupling transformer operatively mounted between a motor housing and the rotor member, a primary coil of said rotary coupling transformer being electrically connectable to a sinusoidal drive signal, a secondary coil of said rotary coupling transformer being electrically connected to the conductive layer of said transmitting disk for providing a drive signal to said transmitting disk.

12. The apparatus of claim 9 wherein said transmitter disk and said receiving disk each include an associated backing member mounted thereto and made from a material having a magnetic permeability greater than one.

13. The apparatus of claim 12 wherein said backing members are made from a material having a magnetic permeability equal to 40.

14. The apparatus of claim 9 wherein said pattern of conductive material mounted on said receiving disk is in the form of a circle having a square wave modified diameter.

15. A method for sensing the relative rotational position between first and second relatively rotatable members, comprising:

(a) providing a transmitter disk having a planar surface;

(b) securing a conductive material to the planar surface of the transmitter disk in a circular pattern having a sinusoidal diameter;

(c) mounting said transmitter disk to said first member so that said planar surface of said transmitter disk is substantially perpendicular the an axis of rotation of the first and second members; and (d) providing a receiving disk having a planar surface;

(e) securing a conductive material to the planar surface of the receiving disk in a pattern so as to receive a signal from the transmitter disk and output of a signal indicative of the relative rotational position of the first and second members; and (f) mounting said receiving disk to said second member so that said planar surface of said receiving disk is substantially perpendicular the an axis of rotation of the first and second members.

16. The method of claim 15 wherein said step of securing a conductive material to said receiving disk includes securing coil patters to each side of three disk layers and electrically insulating each layer from adjacent layers and securing the layers together so that the patterns are electrically offset from each other by 120 degrees.

17. The method of claim 15 further including the steps of mounting a rotary coupling transformer operatively between a stationary member and the first rotary member, connecting a primary coil of said rotary coupling transformer to a sinusoidal drive signal, and connecting a secondary coil of said rotary coupling transformer to the conductive layer of said transmitting disk for providing a drive signal to said transmitting disk.

18. The method of claim 15 wherein the step of securing a conductive material to the planar surface of the receiving disk includes forming said pattern in a circle with a squarewave diameter.

19. A method sensing the relative rational position between a stator and a rotor of a variable reluctance motor, said method comprising the steps of:
   (a) providing a transmitter disk having a planar surface;
   (b) mounting said transmitter disk to said rotor so that said planar surface of said transmitter disk is substantially perpendicular to an axis of rotation of said rotor;
   (c) securing a conductive material to said planar surface of said transmitter disk in a circular pattern having a sinusoidal diameter;
   (d) providing a receiving disk having a planar surface;
   (e) mounting said receiving disk to said stator so that said planar surface of said receiving disk is substantially perpendicular the an axis of rotation of the rotor;
   (f) securing a conductive material to said planar surface of said receiving disk in a circular pattern with a squarewave diameter so as to receive a signal from said transmitter disk and output a signal indicative of the relative rotational position of said rotor relative to said stator;
   (g) coupling a transmitting signal to said conductive layer of said transmitter disk; and
   (h) receiving an output signal from said conductive material of said receiving disk.

20. The method of claim 19 wherein said step of securing a conductive material to said planar surface of said receiving disk in a pattern so as to receive a signal from said transmitter disk and output a signal indicative of the relative rotational position of said rotor relative to said stator includes securing coil patterns to each side of three separate disk layers and electrically insulating the three layers from each other, and electrically offsetting each of the patterns from a pattern on an adjacent disk by 120 electrical degrees, and wherein the method further includes the steps of monitoring the output of the three disk layers, and determining the relative position in response to the three output signals.

21. The apparatus of claim 19 wherein the step of coupling includes the step of mounting a rotary coupling transformer between a motor housing and the rotor member, connecting a primary coil of said rotary coupling transformer to a sinusoidal drive signal, connecting a secondary coil of said rotary coupling transformer to the conductive layer of said transmitting disk for providing a drive signal to said transmitting disk.

22. An apparatus for sensing position of a rotor relative to a stator in a variable reluctance motor, said apparatus comprising:
   a first disk having a planar surface, said first disk mounted to said rotor so that said planar surface of said first disk is substantially perpendicular to the axis of rotation of the rotor;
   a second disk having a planar surface, said second disk being mounted so as to be stationary relative to the stator and adjacent said first disk with said planar surface of said first and second disks being substantially parallel;
   a transmitter coil carried by one of said first and second disks, said transmitter coil being in a circular shape having a diameter modified by a sinusoid;
   a receiving coil carried by the other of said first and second disks;
   means for generating a drive signal and coupling said drive signal to said transmitter coil; and
   means for monitoring the output of said receiving coil and for determining the relative rotation between the rotor and the stator in response to the monitored signal.

23. The apparatus of claim 22 wherein said means for generating a drive signal and coupling said drive signal to said transmitter coil includes a rotary transformer having its primary coil mounted stationary relative to said stator and its secondary mounted to said rotor, said secondary of said rotary transformer being electrically connected to the transmitter coil, said transmitter coil being carried by the disk mounted to said rotor.

24. The apparatus of claim 22 wherein said pattern of conductive material mounted on said receiving disk is in the form of a circle having a square wave modified diameter.

25. An apparatus for sensing position of a rotor relative to a stator in a variable reluctance motor, said apparatus comprising:
   a first disk having a planar surface, said first disk mounted to said rotor so that said planar surface of said first disk is substantially perpendicular to the axis of rotation of the rotor;
   a second disk having a planar surface, said second disk being mounted so as to be stationary relative to the stator and adjacent said first disk with said planar surface of said first and second disks being substantially parallel;
   a transmitter coil carried by one of said first and second disks, said transmitter coil being two coils, each in the shape of a circle having a sinusoidal diameter and being mounted to an associated side of one of the disks with the sinusoids being 180 degrees out of phase;
   a receiving coil carried by the other of said first and second disks;
   means for generating a drive signal and coupling said drive signal to said transmitter coil; and
   means for monitoring the output of said receiving coil and for determining the relative rotation between the rotor and the stator in response to the monitored signal.

26. An apparatus for sensing position of a rotor relative to a stator in a variable reluctance motor, said apparatus comprising:
   a first disk having a planar surface, said first disk mounted to said rotor so that said planar surface of said first disk is substantially perpendicular to the axis of rotation of the rotor;
   a second disk having a planar surface, said second disk being mounted so as to be stationary relative to the stator and adjacent said first disk with said planar surface of said first and second disks being substantially parallel;

a transmitter coil carried by one of said first and second disks;

a receiving coil carried by the other of said first and second disks, said receiving coil including three disk layers, each layer having a receiving coil pattern having the same shape and mounted to said other of said first and second disks in electrically insulated layers, said receiving coil patterns being offset from an adjacent disk receiving coil pattern by 120 electrical degrees;

means for generating a continuous alternating current drive signal and coupling said continuous alternating current drive signal to said transmitter coil; and means for monitoring the output of said receiving coil and for determining the relative rotation between the rotor and the stator in response to the monitored signal.

27. A method for sensing position of a rotor relative to a stator in a variable reluctance motor, said method comprising the steps of:

(a) providing a first disk having a planar surface;

(b) mounting said first disk to said rotor so that said planar surface of said first disk is substantially perpendicular to the axis of rotation of the rotor;

(c) providing a second disk having a planar surface;

(d) mounting said second disk so as to be stationary relative to the stator and adjacent said first disk with said planar surface of said first and second disks being substantially parallel;

(e) providing a transmitter coil and mounting said transmitter coil in the shape of a circle having a sinusoidal diameter to one of said first and second disks;

(f) providing a receiving coil and mounting said receiving coil to the other of said first and second disks;

(g) generating a drive signal;

(h) coupling said drive signal to said transmitter coil;

(i) monitoring the output of said receiving coil; and (j) determining the relative rotation between the rotor and the stator in response to the monitored signal.

28. The apparatus of claim 27 wherein said step of generating a drive signal and coupling said drive signal to said transmitter coil includes providing a rotary transformer, mounting a primary coil of said rotary transformer to a stationary member, stationary relative to said stator, mounting the secondary of the rotary transformer to said rotor, connecting said secondary of said rotary transformer to the transmitter coil, and mounting said transmitter coil to said disk mounted to said rotor.

29. The method of claim 27 wherein the step of providing a receiving coil includes mounting a receiving coil in the shape of a circle having a squarewave diameter.

30. A method for sensing position of a rotor relative to a stator in a variable reluctance motor, said method comprising the steps of:

(a) providing a first disk having a planar surface;

(b) mounting said first disk to said rotor so that said planar surface of said first disk is substantially perpendicular to the axis of rotation of the rotor;

(c) providing a second disk having a planar surface;

(d) mounting said second disk so as to be stationary relative to the stator and adjacent said first disk with said planar surface of said first and second disks being substantially parallel;

(e) providing transmitter coils, each in the shape of a circle having a sinusoidal diameter and mounting said transmitter coils to an associated side of one of said first and second disks so that their circles are 180 degrees out of phase relative to each other;

(f) providing a receiving coil and mounting said receiving coil to the other of said first and second disks;

(g) generating a drive signal;

(h) coupling said drive signal to said transmitter coil;

(i) monitoring the output of said receiving coil; and (j) determining the relative rotation between the rotor and the stator in response to the monitored signal.

31. A method for sensing position of a rotor relative to a stator in a variable reluctance motor, said method comprising the steps of:

(a) providing a first disk having a planar surface;

(b) mounting said first disk to said rotor so that said planar surface of said first disk is substantially perpendicular to the axis of rotation of the rotor;

(c) providing a second disk having a planar surface;

(d) mounting said second disk so as to be stationary relative to the stator and adjacent said first disk with said planar surface of said first and second disks being substantially parallel;

(e) providing a transmitter coil and mounting said transmitter coil to one of said first and second disks;

(f) providing a receiving coil and mounting said receiving coil to the other of said first and second disks so that said receiving coil includes three coil patterns having the same shape mounted in three separate electrically insulated layers and offset from each other by 120 electrical degrees;

(g) generating a continuous alternating current drive signal;

(h) coupling said continuous alternating current drive signal to said transmitter coil;

(i) monitoring the output of said receiving coil; and (j) determining the relative rotation between the rotor and the stator in response to the monitored signal.

* * * * *

UNITED STATES PATENT AND TRADEMARK OFFICE
CERTIFICATE OF CORRECTION

PATENT NO. : 5,406,155
DATED : April 11, 1995
INVENTOR(S) : Erland Persson

It is certified that error appears in the above-indentified patent and that said Letters Patent is hereby corrected as shown below:

Column 11, line 7, change "the" (first occurence) to --to--.

Column 11, line 15, change "the" (first occurence) to --to--.

Column 11, line 61, change "the" to --to--.

Column 11, line 68, change "the" (first occurence) to --to--.

Column 12, line 51, change "the" to --to--.

Column 12, line 62, change "the" to --to--.

Column 12, line 66, change "patters" to --patterns--.

Column 13, line 31, change "the" (first occurence) to --to--.

Signed and Sealed this

Seventh Day of November, 1995

Attest:

Attesting Officer

BRUCE LEHMAN

Commissioner of Patents and Trademarks